United States Patent
Kim et al.

(10) Patent No.: US 10,101,875 B2
(45) Date of Patent: *Oct. 16, 2018

(54) COMPUTER SYSTEM AND CONTROL METHOD THEREOF CAPABLE OF CHANGING PERFORMANCE MODE USING DEDICATED BUTTON

(71) Applicant: Samsung Electronics Co., Ltd., Suwon-si, Gyeonggi-do (KR)

(72) Inventors: Kyoung-youl Kim, Seoul (KR); Min-sun Park, Suwon-si (KR); Keon-young Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

This patent is subject to a terminal disclaimer.

(21) Appl. No.: 14/086,512

(22) Filed: Nov. 21, 2013

(65) Prior Publication Data
US 2014/0082543 A1    Mar. 20, 2014

Related U.S. Application Data

(63) Continuation of application No. 11/777,529, filed on Jul. 13, 2007, now Pat. No. 8,621,474.

(30) Foreign Application Priority Data

Sep. 11, 2006 (KR) .................. 10-2006-0087575

(51) Int. Cl.
*G06F 9/46* (2006.01)
*G06F 3/0482* (2013.01)
(Continued)

(52) U.S. Cl.
CPC .......... *G06F 3/0482* (2013.01); *G06F 1/3203* (2013.01); *G06F 9/485* (2013.01);
(Continued)

(58) Field of Classification Search
CPC .... G06F 1/3203; G06F 3/0482; G06F 9/4818; G06F 9/4831; G06F 9/485; G06F 9/4893;
(Continued)

(56) References Cited

U.S. PATENT DOCUMENTS 5,754,798 A * 5/1998 Uehara et al. ................ 710/104
5,760,636 A    6/1998 Noble et al.
(Continued)

FOREIGN PATENT DOCUMENTS

| CN | 1595361 A | 3/2005 |
|----|-----------|--------|
| CN | 1615472 A | 5/2005 |

(Continued)

OTHER PUBLICATIONS

Miller et al. "Dynamic Adjustment of Program Priority", IBM technical disclosure Bulletin, vol. 37, No. 03, Mar. 1994, pp. 61-62.*

*Primary Examiner* — Meng Ai T An
*Assistant Examiner* — Willy W Huaracha
(74) *Attorney, Agent, or Firm* — Jefferson IP Law, LLP (57) ABSTRACT

An electronic apparatus comprising is provided. The electronic apparatus includes a keyboard to receive a user input to switch from a normal performance mode to a high performance mode, a processor to reassign a higher priority to a program, which has been active with a priority in the normal performance mode, such that the program is executed with the higher priority in the high performance mode that otherwise would have been executed with the priority previously assigned, and a display screen to display a mode indication visibly indicating at least one of the normal performance mode or the high performance mode.

8 Claims, 9 Drawing Sheets

(51) Int. Cl.
 G06F 1/32 (2006.01)
 G06F 9/48 (2006.01)

(52) U.S. Cl.
 CPC .......... G06F 9/4818 (2013.01); G06F 9/4831
 (2013.01); G06F 9/4893 (2013.01); *Y02D*
 *10/124* (2018.01); *Y02D 10/24* (2018.01)

(58) Field of Classification Search
 CPC .................. Y02B 60/1214; Y02B 60/144;
 Y02D 10/124; Y02D 10/24
 USPC .............................................. 718/102, 103
 See application file for complete search history.

(56) References Cited

U.S. PATENT DOCUMENTS

| | | | |
|---|---|---|---|
| 5,826,092 A | 10/1998 | Flannery | |
| 5,920,730 A * | 7/1999 | Vincent | G06F 3/021 341/22 |
| 6,014,611 A * | 1/2000 | Arai | G06F 1/206 702/132 |
| 6,081,901 A * | 6/2000 | Dewa | G06F 1/3203 713/300 |
| 6,480,964 B1 | 11/2002 | Oh | |
| 6,507,306 B1 * | 1/2003 | Griesau et al. | 341/176 |
| 6,678,830 B1 | 1/2004 | Mustafa et al. | |
| 6,829,713 B2 * | 12/2004 | Cooper et al. | 713/320 |
| 7,584,475 B1 | 9/2009 | Lightstone et al. | |
| 7,690,003 B2 * | 3/2010 | Fuller | 719/321 |
| 8,255,724 B2 * | 8/2012 | Das | G06F 1/3203 455/574 |
| 2004/0107372 A1 * | 6/2004 | Morisawa | G06F 1/14 713/300 |
| 2005/0022186 A1 | 1/2005 | Accapadi et al. | |
| 2005/0050552 A1 | 3/2005 | Fuller | |
| 2005/0102560 A1 | 5/2005 | Taketoshi et al. | |
| 2005/0125789 A1 * | 6/2005 | Dijkstra et al. | 718/100 |
| 2006/0037025 A1 * | 2/2006 | Janssen | G06F 9/4881 718/107 |
| 2006/0114267 A1 * | 6/2006 | Park | G06F 1/3203 345/619 |
| 2007/0136731 A1 | 6/2007 | Bennington et al. | |
| 2007/0294554 A1 | 12/2007 | Kim | |
| 2010/0191349 A1 | 7/2010 | Munaga | |
| 2010/0281485 A1 | 11/2010 | Ferch et al. | |
| 2011/0283033 A1 | 11/2011 | Yamada et al. | |

FOREIGN PATENT DOCUMENTS

| | | |
|---|---|---|
| CN | 1627264 A | 6/2005 |
| EP | 1 878 542 A1 | 1/2008 |
| JP | 7-319569 A | 12/1995 |
| JP | 9-101847 A | 4/1997 |
| JP | 2000-222075 A | 8/2000 |
| JP | 2001-034371 A | 2/2001 |
| JP | 2001-0034371 A | 2/2001 |
| JP | 2003-084989 A | 3/2003 |
| KR | 10-2000-14377 A | 3/2000 |
| KR | 10-2004-0018086 A | 3/2004 |

\* cited by examiner

COMPUTER SYSTEM AND CONTROL METHOD THEREOF CAPABLE OF CHANGING PERFORMANCE MODE USING DEDICATED BUTTON

CROSS-REFERENCE TO RELATED APPLICATION(S)

This is a continuation application of U.S. patent application Ser. No. 11/777,529 filed on Jul. 13, 2007 in the U.S. Patent and Trademark Office, now issued as U.S. Pat. No. 8,621,474 on Dec. 31, 2013, which claimed the benefit under 35 U.S.C. § 119(a) of a Korean Application No. 10-2006-0087575, filed Sep. 11, 2006 in the Korean Intellectual Property Office, the disclosure of which is incorporated herein by reference.

BACKGROUND OF THE INVENTION

1. Field of the Invention

Aspects of the present invention relate to a computer system and a control method thereof which run processes of a plurality of programs being executed according to a priority order.

2. Description of the Related Art

The performance of a computer depends on a variety of factors, such as the running speed of a process, the life of a battery, noise, and so on. These factors, however, are mutually exclusive. For example, if the speed of a process increases, the life of the battery decreases and the noise of the computer system increases. Therefore, it is difficult to improve the running speed of the process, the life of the battery, the noise, etc., at the same time. Accordingly, it is preferable that factors are properly controlled depending on the circumstances, so that the computer may operate at optimal performance.

To improve the performance of a computer system, a conventional art (such as that described in Japanese patent first publication No. 07-0319569) discloses a way to convert a system operating environment, such as a power-saving mode, a high performance mode, and so on, through inputting a hot key by a system management interrupt (SMI). Though it is possible to change a mode in hardware, such as a CMOS memory, SMI, etc., it is impossible to do so in software, such as a priority control of an application thread or changing a power scheme which is applied by an Operating System (OS), in the conventional art.

In a typical Operating System (OS), such as Microsoft Windows, if a user wants to change a priority order of the application thread, i) the user pushes Ctrl+Alt+Del keys to run "Windows task manager"; ii) the user selects "select columns" in the "View" menu and selects "base priority" item in a dialog box; and iii) the user selects the process which the user wants and clicks the right mouse button. This procedure, which preferentially allocates a resource to a predetermined process, is very complicated. Accordingly, though an ordinary user may want to improve the running performance of a program, the user does not know how to do so. Thus, the user is not able to run the system at an optimal level of performance. Even if the user does know how to change the priority, the procedure is still cumbersome.

SUMMARY OF THE INVENTION

Aspects of the present invention provide a computer system and control method thereof capable of operating at peak performance according to a working circumstance, which is selected by a user, via a simple operation.

Additional aspects of the present invention provide a computer system and control method thereof capable of improving performance by allocating a resource to a program, determined by the user, prior to other programs. Also, additional aspects of the present invention provide a computer system and control method thereof capable of improving performance by changing a performance mode according to the working circumstance by activating a button a limited number of times.

According to an aspect of the present invention, a computer system comprises a process running unit to run processes of a plurality of programs; a user input unit through which a user inputs a command to select one of a plurality of performance modes; and a controller to control the process running unit to run a process of a program of the programs, which are currently being executed, according to a priority order corresponding to the performance mode selected by the user's command.

According to another aspect of the invention, the process running unit runs the processes of the programs being currently executed according to the priority order.

According to another aspect of the invention, the process running unit runs the process by executing an OS providing an API that allows changing the priority order, and the controller executes an application program to change the priority order of the program using the API.

According to another aspect of the invention, the performance modes comprise a normal mode corresponding to a predetermined priority order and a high performance mode corresponding to a priority order which is higher than the normal mode.

According to another aspect of the invention, one of the programs currently being executed is a currently activate program.

According to another aspect of the invention, the user input unit comprises at least one button to allow the user to input a command, and the controller determines that one of the performance modes is selected if a predetermined time period has passed after the button is activated.

According to another aspect of the invention, the computer system further comprises a graphic processor to display a graphic image related to selection of the performance modes on a predetermined display apparatus according to control by the controller.

According to another aspect of the invention, the controller controls the graphic processor to display the graphic image, which shows a current performance mode of the performance modes if the button is pushed, and shows changing the performance modes one by one whenever the button is pushed again.

According to another aspect of the invention, the process running unit comprises a CPU to execute the program, and the controller adjusts at least one level of over-clocking, or one level of throttling, of the CPU according to the selected performance mode.

According to another aspect of the invention, the computer system further comprises a fan to cool the CPU and a storage unit and the controller controls performance of at least one of the fan and the ODD according to the selected performance mode.

The foregoing and/or other aspects of the present invention can be achieved by providing a control method of a computer system running processes of a plurality of programs that are currently executing on the computer system, the method comprising: receiving a user's command to select one of a plurality of performance modes; and running a process of one of the plurality of programs according to a priority order corresponding to the performance mode selected by the user's command.

According to another aspect of the invention, running the process runs the processes of the programs being currently executed according to the priority order.

According to another aspect of the invention, running the process comprises running the process by executing an OS providing an API that allows changing the priority order of the programs, and executing an application program to change the priority order of one of the programs by the API.

According to another aspect of the invention, the performance modes comprise a normal mode corresponding to a predetermined priority order and a high performance mode corresponding to a priority order higher than the normal mode.

According to another aspect of the invention, one of the plurality of programs currently executing is a currently activate program.

According to another aspect of the invention, receiving the user's command comprises receiving the user's command via a user input unit having at least one button with which the user inputs the command, and the running the process determines that one of the performance modes is selected if a predetermined time passes after the button is pushed.

According to another aspect of the invention, the control method of the computer system further comprises displaying a graphic image related to selection of the performance modes.

According to another aspect of the invention, the displaying the graphic image comprises displaying the graphic image showing a current performance mode of the performance modes if the button is pushed and displaying the graphic image showing the performance modes being changed one by one whenever the button is pushed again.

According to another aspect of the invention, and the method further comprises adjusting at least one level between over-clocking and throttling of a CPU according to the selected performance mode.

According to another aspect of the invention, the method further comprises controlling performance of at least one of a fan and a storage medium according to the selected performance mode.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of the exemplary embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 1:
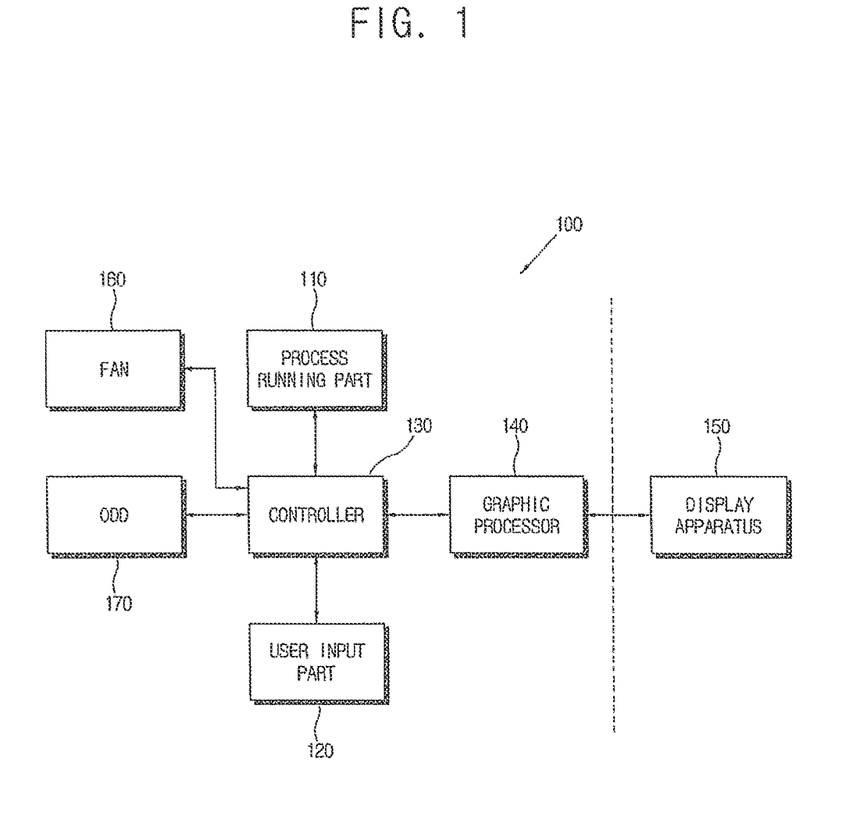
FIG. 1 is a block diagram illustrating a configuration of a computer system according to an embodiment of the present invention.

As shown in FIG. 1, a computer system 100 comprises a process running unit 110, a user input unit 120 and a controller 130. The controller 130 controls a fan 160, an optical disk drive 170, and a graphic processor 140 to display images on a display apparatus 150.

The process running unit 110 runs processes of a plurality of programs, which are currently being executed, according to a priority order of the programs. The user input unit 120 receives a command, such as from a user, to select one of a plurality of performance modes and transmits the received command to the controller 130. When the controller 130 receives the command via the user input unit 120, the controller 130 controls the process running unit 110 to run a process of one of the plurality of programs according to a priority order corresponding to the performance mode selected by the command. While not required, the input part 120 can be a port through which the command is received or may be a keyboard, mouse, or like input device.

The process running unit 110 executes an Operating System (OS), such as Microsoft Windows, to run the processes. The OS provides an Application Programming Interface (API) allowing an application program to change the priority order of the programs. The controller 130 may be embodied with a predetermined application program to change the priority order of the programs using the API provided in the OS.

Figure 2:
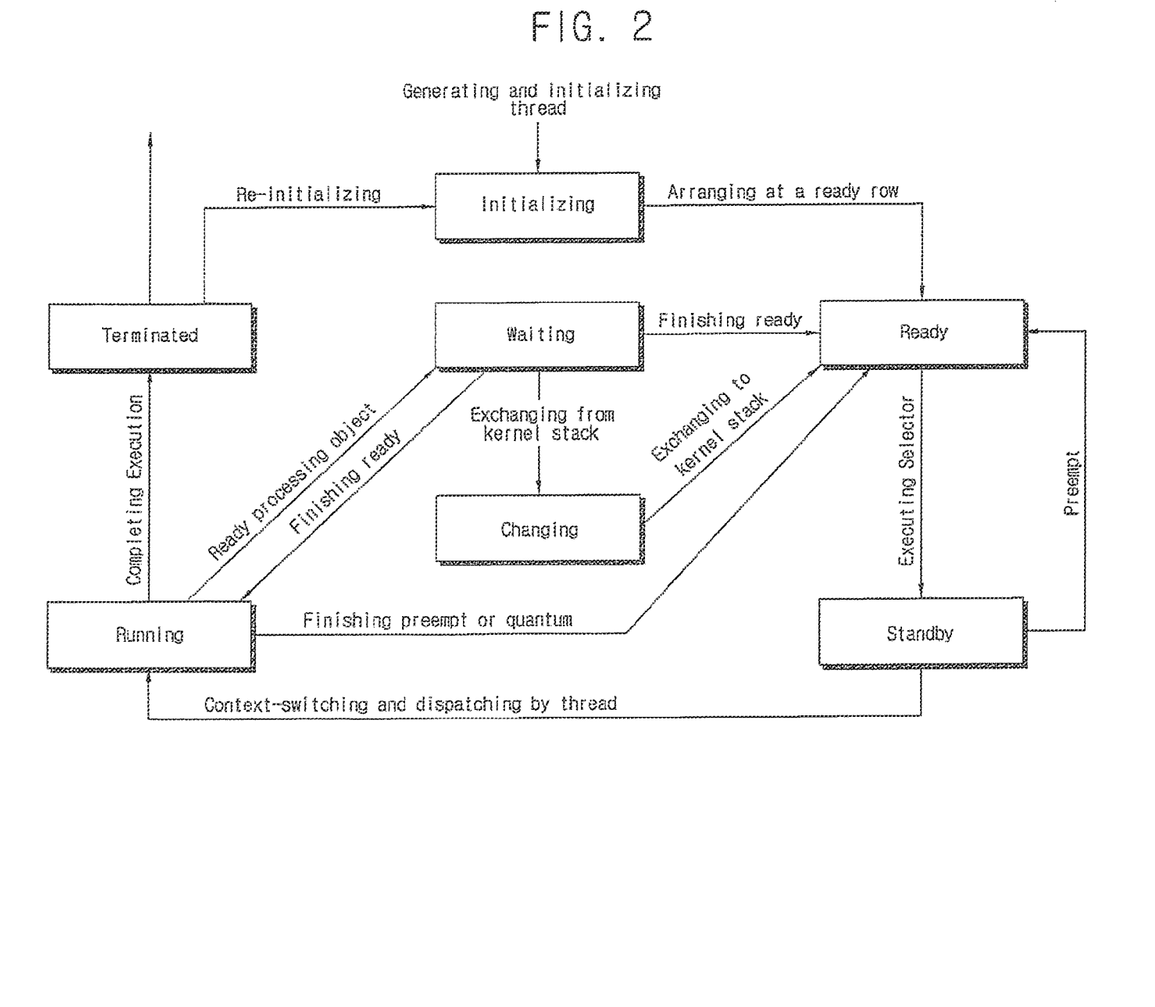
FIG. 2 illustrates a thread status of an operating system.
Figure 3:
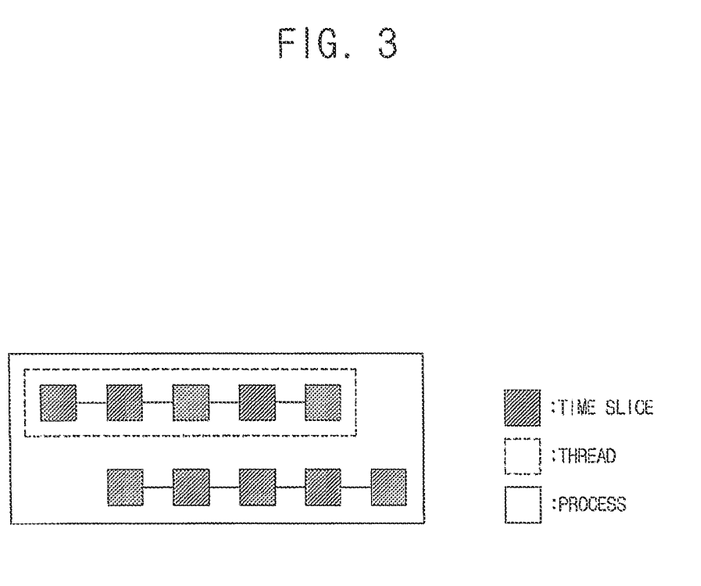
FIG. 3 illustrates a configuration of a process, a thread and a time slice.

One CPU is capable of running only one task at a time. Multitasking, or executing multiple programs at once, means using context switching in the CPU (Central Processing System) to give the appearance of multiple programs running at the same time. As shown in FIG. 2, the OS manages threads in various states: ready, waiting, running, terminated, etc. For reference, a program is a combination of at least one process and a process has at least one thread. Threads comprise a unit like a time slice or a quantum. FIG. 3 shows a configuration of the process, the thread and the time slice. In the examples shown, the term "process" generally refers to threads (and time slices) if not otherwise mentioned.

As shown in FIG. 2, first, each time slice changes between the ready, the running and the waiting states. If the running state is finished, the time slice changes to the terminated state. Herein, the time slice in the running state uses the CPU. When a thread begins operation, the thread is initialized. Once initialization is complete and the thread is ready to run, the thread moves to the ready state. When a selector (which may be included in the CPU or in another component) determines that the thread may run, the thread moves to the standby state while the selector prepares the CPU, memory, etc., for running the thread. If the thread is preempted while in the standby state (for example by a higher-priority thread as described below), the thread returns to the ready state. If a thread in the running state no longer requires the CPU, for example because the thread is waiting for an I/O or other process to complete, the thread moves to the waiting state so that another thread can run. The thread may return to either the running state or the ready state once the process completes. In addition, if moving from the waiting state to the ready state requires adjusting a kernel stack, the thread moves to a changing state where the kernel stack is prepared to receive another thread.

When the time slice for a thread in the running state ends, the thread returns to the ready state from the running state. When the thread completes execution, the thread moves to the terminated state where the thread terminates. Subsequently, if the thread needs to run again, the thread is re-initialized, returning to the initializing state.

The OS executes the plurality of programs according to the priority order. In other words, if multiple programs need to run at the same time, the OS runs the program with a high priority order prior to other programs. The priority order of the thread may be changed. Threads can be executed in several ways, including a voluntary switching method and a preemption method.

Figure 4:
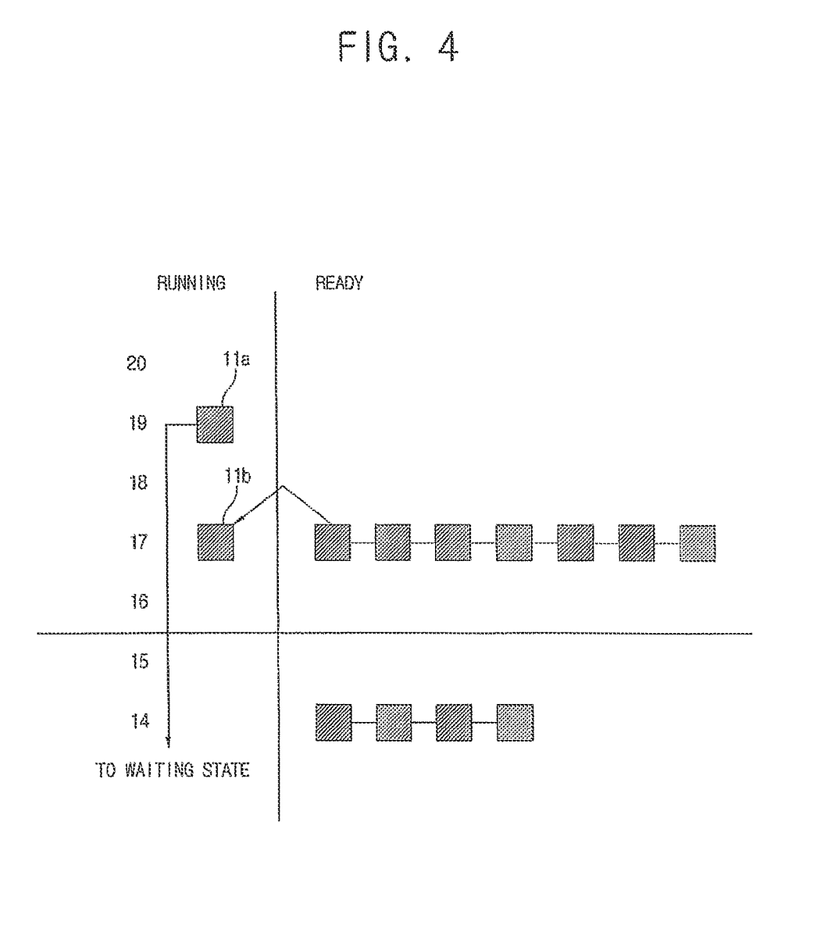
FIG. 4 is a diagram explaining voluntary switching.

As shown in FIG. 4, voluntary switching is similar to a situation where a customer A is waiting for a hamburger after ordering the hamburger in a hamburger shop and another customer B orders. In other words, while the thread A 11a (shown in FIG. 4) is executing a job which will take a long time, the thread A 11a moves to the waiting state since its priority order becomes low. Accordingly, while the thread A 11a is in the waiting state, another thread B 11b can run.

Figure 5:
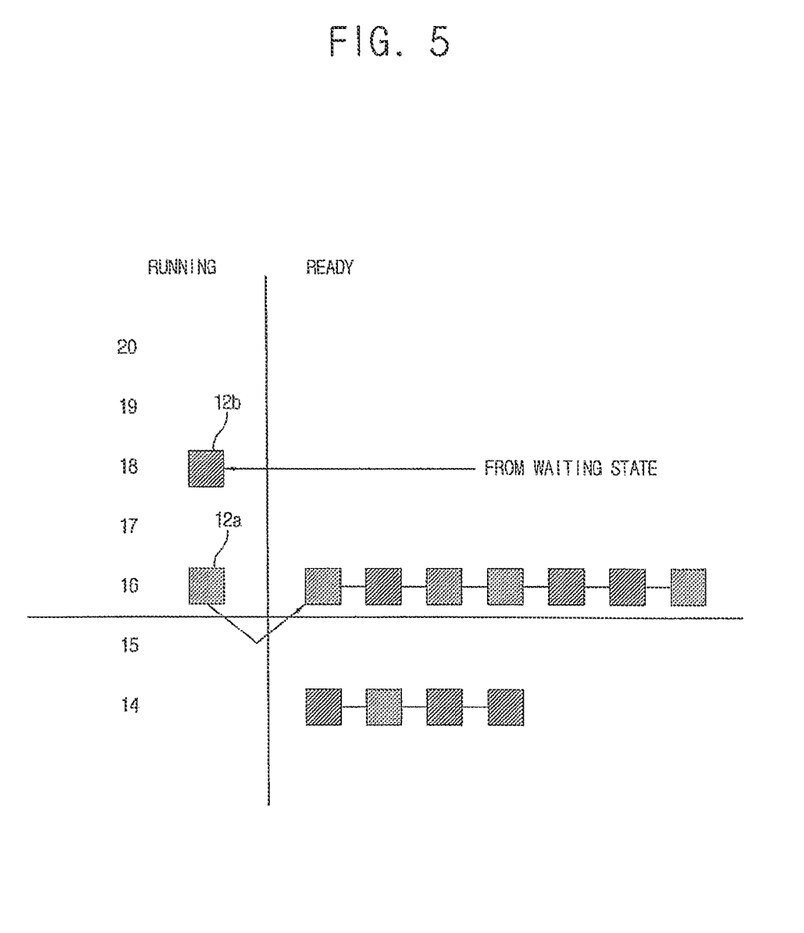
FIG. 5 is a diagram explaining preemption.

As shown in FIG. 5, preemption is similar to a situation where the customer A is just starting to order the hamburger when an important customer B suddenly comes into the hamburger shop and is allowed to order before the customer A. The customer A is "preempted": he is not allowed to order and must get back in line. In other words, even though the thread A 12a is in the running state, if the thread B 12b which has higher priority order is in the waiting state, thread A 12a is stopped and the thread B 12b, having the higher priority order, is allowed to run.

Figure 6:
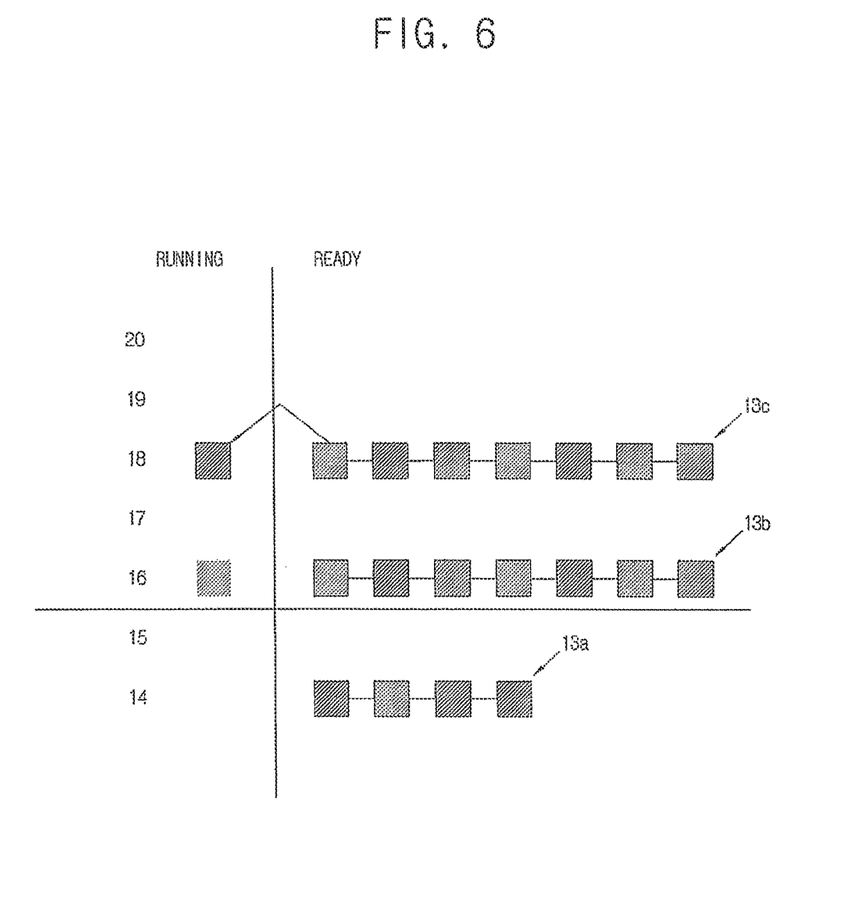
FIG. 6 illustrates running a thread according to an embodiment of the present invention.

The controller 130 raises the priority order of a program using the API. Accordingly, the process running unit 110 runs the corresponding program prior to other programs according to the raised priority order. As shown in FIG. 6, when the threads 13a, 13b, and 13c of programs 14, 16, and 18 are in the ready state, if the priority order of the program to which the thread 13c belongs increases, the thread 13c is executed before the threads 13a and 13b of programs 14 and 16. Therefore, the running speed of the program which the user is using increases and the user perceives a better performance.

The program may be a currently active program among the plurality of programs currently executing. The plural performance modes may comprise a normal mode and a high performance mode. The normal mode may correspond to a general priority order set in the OS. The high performance mode may correspond to a priority order higher than the normal mode. However, other performance modes can be used, such as modes to achieve energy efficiency, modes for gaming, or modes for recording/reproducing audio or video.

The user input unit 120 may have at least one button (not shown) to select the performance mode. For example, the button may be a predetermined key in a keyboard. However, the performance mode can be selected in any manner, such as by a predetermined keystroke (e.g., "Control-Alt-Delete"), by a graphical interface, or by a menu. The controller 130 selects one of the plural performance modes according to the user's input.

To simplify operation, the controller 130 may determine that one of the plural performance modes is selected if a predetermined period of time passes after the button is pushed. For example, if the button is pushed once, the controller 130 determines that that the user wants to change the performance mode. If the button is inputted again within one second (or another predetermined period of time), the controller 130 determines that the next performance mode is selected. If the button not pushed after a predetermined time period (e.g., one second), the controller 130 changes the current performance mode to the performance mode last selected. In this fashion, the user can easily select the performance mode suitable for the current situation.

Furthermore, the computer system 100 may display a selection state of the performance mode. The computer system 100 may further comprise a graphic processor 140 to display a graphic image related to selection of the plural performance modes on the display apparatus 150 according to controlling of the controller 130. The graphic processor 140 may be embodied with a Graphic Device Interface (GDI) of the OS and a graphics card (not shown). The graphic image may be displayed as a format of an On Screen Display (OSD). The display apparatus 150 may include a monitor attached to computer system 100 or can be integral to the system 100 and/or the input part 200.

Figure 7:
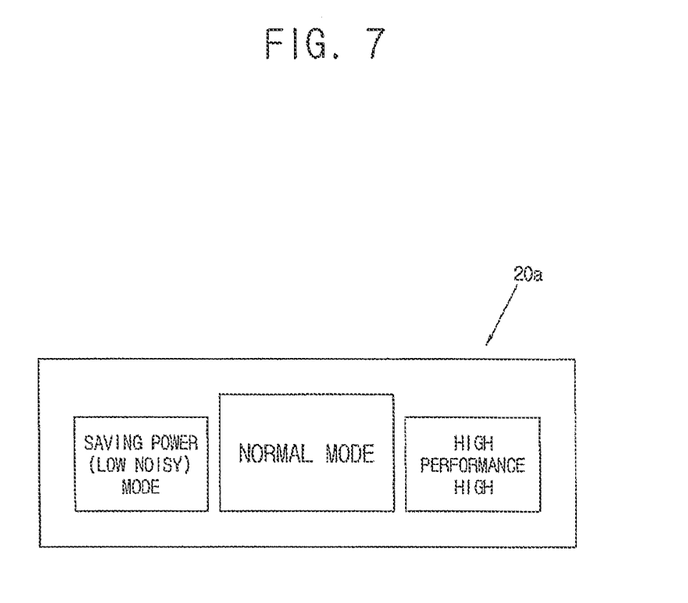
FIGS. 7 and 8 illustrate a graphic image related to select of a performance mode according to an embodiment of the present invention.
Figure 8:
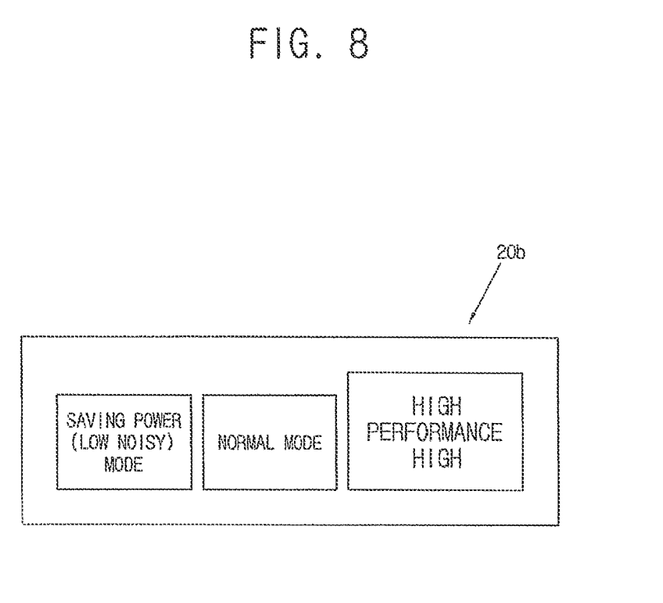

As shown in FIGS. 7 and 8, the controller 130 controls the graphic processor 140 to display the graphic image 20a, which shows the current performance mode and the other performance modes, if the button is pushed. In FIG. 7, the graphic image 20a shows that the current performance mode is the normal mode. Whenever the button is pushed again, the controller 130 controls the graphic processor 140 to display the graphic image 20b, which shows changing modes one by one. As shown in FIG. 8, the graphic image 20b shows the performance mode changed from the normal mode to the high performance mode. Other aspects of the invention may display the performance modes differently and/or may permit the user to change performance modes in a different fashion.

While not required in all aspects, the controller 120 may control a characteristic of the computer system 100 in addition to the priority order of the process so that the performance of the computer system 100 can be improved. These characteristics may include over-clocking and throttling the CPU. The controller 130 may change a level of over-clocking, throttling, etc., according to the performance mode selected by the user. For example, the controller 130 may raise the level of over-clocking, throttling, etc., if the performance mode changes from the normal mode to the high performance mode.

While not required in all aspects, the computer system 100 includes a fan 160 to cool the CPU and an Optical Disk Drive (ODD) 170, which is an example of an internal or external storage unit. The controller 130 may control the performance of the fan 160 and the ODD 170 according to the performance mode selected by the user. For example, the controller 130 may speed up the rotation of the fan 160 and operation of the ODD 170 if the performance mode is changed from the normal mode to the high performance mode. While described in terms of an ODD 170, it is understood that other media drives, such as magnetic media drives, can be used in addition to or instead of the ODD 170. Additionally, while described in terms of a fan 160, it is understood that any system environmental controller or environmental management unit can be used which governs the environment of the computer system 100, an example of which includes the fan 160.

Furthermore, the plural performance modes may comprise a power-saving (low noise) mode in addition to the normal mode and the high performance mode. The power-saving (low noise) mode consumes less power and makes less noise than the normal mode or the high performance mode. If the power-saving (low noisy) mode is selected as the performance mode, the controller 130 may reduce the level of over-clocking, throttling, etc., and/or slow the rotation of the fan 160 or the operation of the ODD 170.

Table 1 shows the plurality of performance modes and the characteristics of the system as described above. Other aspects of the invention may include additional performance modes having varying priority and speed controls.

TABLE 1

| Mode | Priority of the process | Controlling over-clocking of the CPU | Controlling the speed of the fan | Controlling the speed of the ODD | throttling of the CPU |
|---|---|---|---|---|---|
| High performance mode | high | ON | high | high | High |
| normal mode | normal | OFF | normal | normal | normal |
| power-saving (low noise) mode | normal | OFF | low | low | low |

As shown in table 1, the normal mode corresponds to general operations of the system. In the normal mode the functions of the power-saving (low noise) mode and the high performance mode are turned off. In the normal mode, processes run with normal priority and the fan 160 and ODD 170 may operate at their normal rates. The normal mode may be the default mode, used when neither high performance nor energy efficiency/quiet operation is needed.

The power-saving (low noise) mode may be used when the user operates the computer system 100 in a quiet place, such as a library; wants quiet at night; wants to extend the life of a battery; etc. In the low-priority mode, the fan 160 may rotate at a slower rate and the ODD 170 may operate at a slower rate, so as to reduce noise and extend battery life. A process running in the power-saving mode may run at a lower priority than processes running in the normal or high performance modes.

The high performance mode may be used when the user feels that a particular program is not running smoothly or when using a program that requires significant system resources, such as multimedia, 3D games, etc. In the high-priority mode, the fan 160 may rotate at a higher speed so as to cool the CPU and allow the CPU to operate at a higher clock speed. Similarly, the ODD 170 may operate at a faster rate so as to allow accessing of more data at a faster rate. A thread running in high-performance mode may be given a higher priority, so that the thread will pre-empt a thread with normal priority, as described above with respect to FIGS. 2 and 5.

Figure 9:
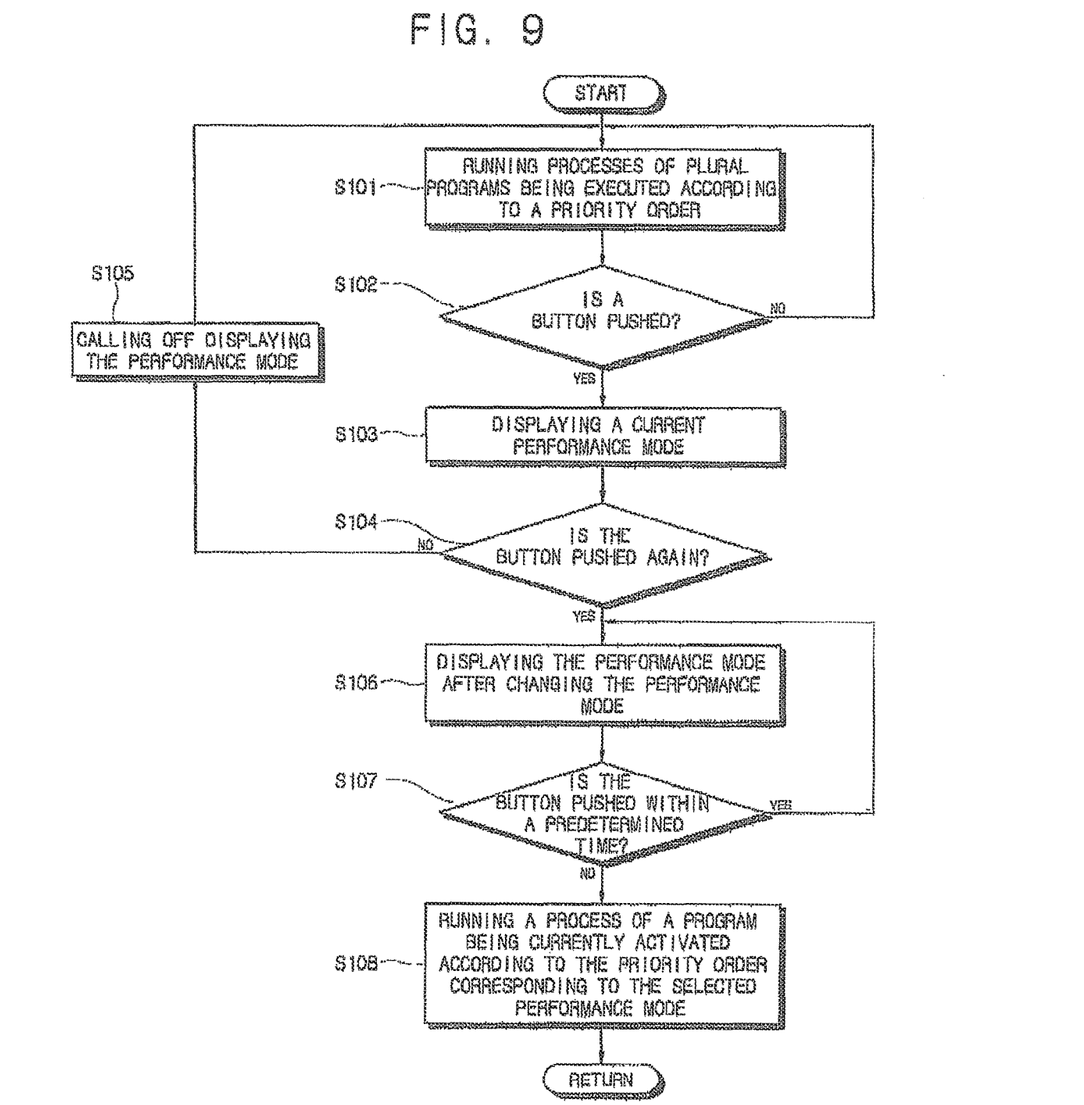
FIG. 9 illustrates an operation of a computer system according to an embodiment of the present invention.

FIG. 9 is a flowchart of a routine to change the priority of currently executing programs according to an embodiment of the present invention. First, the process running unit 110 runs the processes of the currently executing plurality of programs according to the priority order at operation S101. The controller 130 determines whether the button to select the performance mode is pushed at operation S102. If the button is not pushed, the routine returns to operation S101. While described as a single push, it is understood that a button sequence can be used and/or that a click of a mouse can be used to select the performance mode.

If it is determined that the button is pushed at operation S102, the controller 130 determines that selection of the performance mode has started and controls the graphic processor 140 to display the graphic image showing the current performance mode at operation S103. Next, the controller 130 determines whether the button to select the performance mode was pushed again within the predetermined time period at operation S104. If the controller 130 determines that the button was not pushed within the predetermined time period, the controller 130 controls the graphic processor 140 to stop displaying the performance mode by deleting the displayed graphic image at operation S105, and the routine returns to operation S101.

If the controller 130 determines that the button was pushed again within the predetermined time period, the controller 130 controls the graphic processor 140 to display the graphic image showing the changed performance mode at operation S106. Next, the controller 130 determines whether the button is pushed within the predetermined time period at operation S107. If it is determined that the button was pushed again within the predetermined time period, the routine returns to operation S106.

If it is determined that the button was not pushed within the predetermined time period, the controller 130 controls the process running unit 110 to run the process of the currently active program according to the priority order corresponding to the selected performance mode at operation S108.

As described above, the computer system 100 and control method thereof are capable of operating at peak performance according to the current situation, selected by a user with a simple operation.

According to aspects of the present invention the power-saving (low noise) mode, the normal mode, and the high performance mode can be changed according to circumstances, so that the limited resources of the system can be used efficiently. For example, high performance mode can solve problems of slow or choppy video when the user runs a game or a moving picture. Also, the user is able to use the computer system 100 in a quiet place without any restrictions and the life of the battery can be extended when the user uses the power-saving (low noise) mode.

Especially, aspects of the present invention are capable of easily changing the mode to a suitable mode for the current circumstance by clicking the button just once so that it is very convenient for the user. Other aspects of the present invention allow changing the priority order of the process running via the OS, so that it is capable of improving the user's perceived performance, using software, not additional hardware.

The performance mode changing techniques and the controller according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc., including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention. Although a few embodiments of the present invention have been shown and described, it would be appreciated by those skilled in the art that changes may be made in this embodiment without departing from the principles and spirit of the invention, the scope of which is defined in the claims and their equivalents.

While described in the context of a computer, it is understood that aspects of the invention can be implemented in other contexts, such as a portable processor used in a media player, phone, or other portable or non-portable device.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. An electronic apparatus for changing a performance mode among a plurality of performance modes using a dedicated key, comprising:
   a keyboard configured to receive a single keystroke input from the dedicated key to switch between performance modes, the performance modes including at least a normal performance mode and a high performance mode;
   a display screen; and
   a processor coupled to at least one of an optical disk drive (ODD), and a fan, and configured to:
   run processes of a program of a plurality of programs, which are currently active and executing according to a priority order corresponding to a current performance mode,
   determine whether a keystroke input from the dedicated key to switch between the performance modes is received via the keyboard, and
   in response to the determination that the keystroke input is received, display
   an indicator of the current performance mode on the display screen,
   wherein, when the current performance mode corresponds to the normal performance mode and another keystroke input from the dedicated key is received within a predetermined period of time, the processor is further configured to switch the current performance mode to execute the processes according to a high priority order corresponding to the high performance mode,
   wherein, when the current performance mode corresponds to the high performance mode and another keystroke input from the dedicated key is received within the predetermined period of time, the processor is further configured to switch the current performance mode to execute the processes according to a normal priority order corresponding to the normal performance mode,
   wherein the processor, when switching between the performance modes, is further configured to increase or decrease an operating speed of at least one of the ODD, and the fan according to the current performance mode, and
   wherein a user is able to select the normal performance mode or the high performance mode with the single keystroke input through the dedicated key without calling for a task manager dialog box, which is provided from an Operating System (OS) of the electronic apparatus, on the display screen.

2. The electronic apparatus according to claim 1, wherein the processor is further configured to increase or decrease a priority order for the processes being performed by the processor based on the current performance mode.

3. The electronic apparatus according to claim 2, wherein the processor is further configured to:
   if the current performance mode corresponds to the normal performance mode, execute the processes according to the normal priority order in which threads of the processes are performed in a normal order, and
   if the current performance mode corresponds to the high performance mode, execute the processes according to the high priority order in which threads of the processes are performed in an order other than the normal order.

4. A method of an electronic apparatus, comprising:
   running processes of a program of a plurality of programs, which are currently active and executing according to a priority order corresponding to a current performance mode;
   determining whether a single keystroke input from a dedicated key to switch between performance modes is received via a keyboard;
   in response to the determination that the single keystroke input is received, displaying an indicator of the current performance mode on a display screen,
   when the current performance mode corresponds to a normal performance mode and another keystroke input from the dedicated key is received within a predetermined period of time, executing the processes according to a high priority order corresponding to a high performance mode;
   when the current performance mode corresponds to the high performance mode and another keystroke input from the dedicated key is received within the predetermined period of time, executing the processes according to a normal priority order corresponding to the normal performance mode;
   when switching between the performance modes, increasing or decreasing an operating speed of at least one of an optical disk drive (ODD), and a fan according to the current performance mode; and
   in response to the determination that the single keystroke input is received, displaying an indicator of the current performance mode on the display screen,
   wherein a user is able to select the normal performance mode or the high performance mode with the single keystroke input through the dedicated key provided in the keyboard without calling for a task manager dialog box, which is provided from an Operating System (OS) of the electronic apparatus, on the display screen.

5. The method according to claim 4, further comprising executing an application that allows changing a priority order of the processes.

6. The method according to claim 4, further comprising:
if the current performance mode corresponds to the high performance mode, increasing a clock speed of a processor; and
if the current performance mode corresponds to the normal performance mode, decreasing the clock speed of the processor.

7. The method according to claim 6, wherein the receiving of the single keystroke input further comprises receiving a command including a set of system control information capable of indicating a plurality of system performance parameters in addition to the current performance mode.

8. The method according to claim 7, wherein the set of system control information indicates a setting for the processor, a system environmental control, and a drive speed.

* * * * *